July 21 1925.
A. E. ANDERSON
1,546,879
AUTOMATIC RECLOSING CIRCUIT BREAKER SYSTEM
Filed Aug. 8, 1923
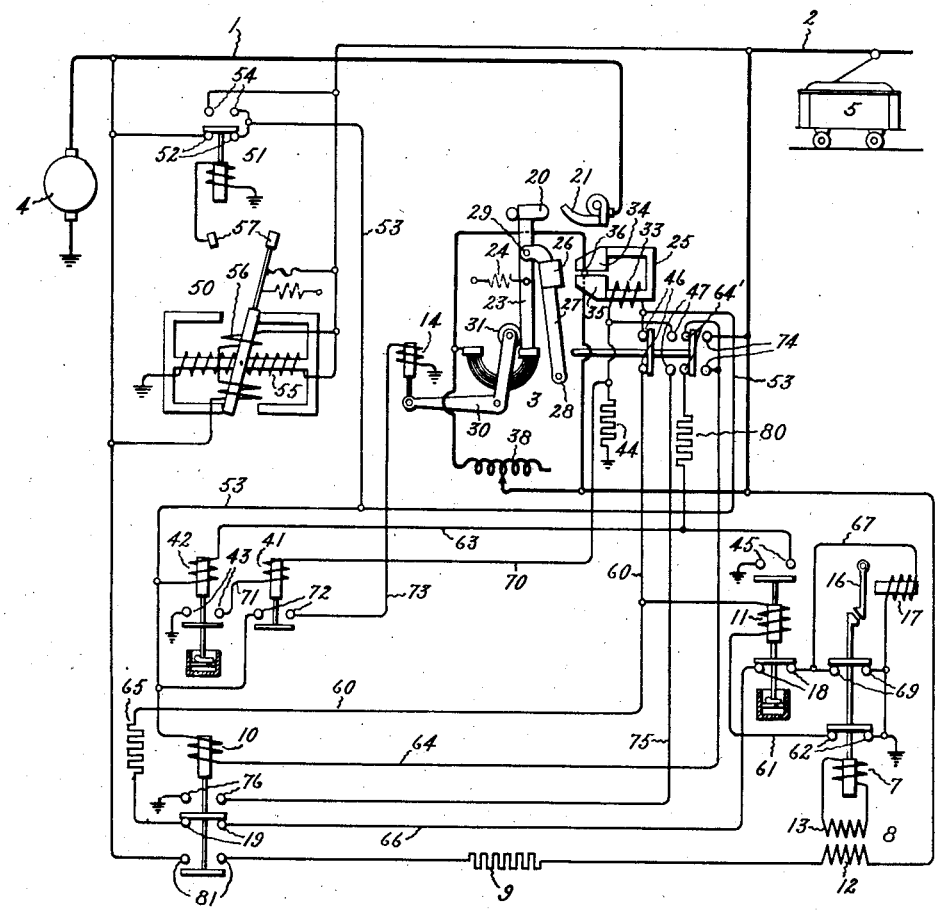
Inventor:
Arvid E. Anderson,
by *Alexander F. Lentz*
His Attorney.

Patented July 21, 1925.

1,546,879

UNITED STATES PATENT OFFICE.

ARVID E. ANDERSON, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed August 8, 1923. Serial No. 656,381.

*To all whom it may concern:*

Be it known that I, ARVID E. ANDERSON, a citizen of the United States, residing at Schenectady, county of Schenectady, State of New York, have invented certain new and useful Improvements in Automatic Reclosing Circuit-Breaker Systems, of which the following is a specification.

My invention relates to automatic reclosing circuit-breaker systems and particularly to such systems in which the reclosing of a circuit breaker, which is arranged to connect a supply circuit to a load circuit, is controlled by the load connected to the load circuit.

In Letters Patent #1,514,570 granted Nov. 4, 1924, to Gracie Hall Roosevelt and assigned to the same assignee as this application, there is disclosed and broadly claimed an automatic reclosing circuit breaker system in which the reclosing of the circuit breaker is controlled in accordance with the relative amounts of inductance and resistance of the load connected to the load circuit. When an abnormal condition occurs on the load circuit the circuit breaker between the supply circuit and the load circuit opens. After the circuit breaker opens, a current change is produced in a circuit including the load circuit and the rate of change of the current in this circuit is used to control the reclosing of the circuit breaker so that it will reclose in response to a predetermined value of resistance when there is a normal load connected to the load circuit and will not reclose in response to the same value of resistance when there is a short circuit connected to the load circuit.

The object of my invention is to provide an improved arrangement of apparatus and circuits for accomplishing the results obtained by the automatic reclosing circuit breaker system shown in the above-mentioned application.

My invention will be better understood from the following description taken in connection with the accompanying drawing and its scope will be pointed out in the appended claims.

Referring to the drawing, 1 and 2 represent conductors of two circuits of a direct current system which are arranged to be connected together by a circuit breaker 3 of any suitable type. The conductors 1 and 2 may, for example, be considered as sections of a railway circuit, the conductor 1 being part of the supply circuit, which is connected to a source of current 4, and the conductor 2 being part of the load circuit which is connected to the load 5. The return circuit of the two direct current circuits may be assumed to be through ground, although it is apparent that it is immaterial whether a grounded return or a metallic return is used. The load circuit may also be supplied with current from some other source, not shown, as the number of sources connected to the load circuit is immaterial.

As shown, the circuit breaker 3 is of the type disclosed in the copending patent application, Serial No. 511,000, filed October 28, 1921, by J. F. Tritle and assigned to the same assignee as this application, and as is hereinafter described is arranged to open automatically in response to a predetermined load current under normal overload conditions and a materially smaller value of load current under other conditions, such for example as short circuit conditions.

It is desirable that the circuit breaker 3 should remain open as long as there is either a short circuit or an excessive normal overload connected to the load circuit and should automatically reclose as soon as the normal or useful load is less than a certain amount and there is no short circuit connected to the load circuit. Therefore it is necessary to provide suitable means which is able to discriminate between a short circuit and a useful load connected to the load circuit when the circuit breaker is open. This means in the system shown is the reclosing relay 7 which is connected, by means of the transformer 8, to a circuit, including a current limiting means 9 shown as a resistor, which is arranged to be connected between the supply circuit and the load circuit by means of a contactor 10 after the circuit breaker opens. The circuit of the contactor 10 is completed by means of a time relay 11 which is energized in response to the opening of the circuit breaker 3. The time relay is designed in any suitable manner so that it does not close the circuit of the contactor 10 until after the time relay has been energized a certain length of time. One object in making the relay slow in responding is to allow sufficient time to elapse after the circuit breaker opens so that the conditions on the load circuit may become stable before an attempt is made to determine the electrical conditions of the load circuit.

It is apparent that when the contactor 10 closes, a current change is produced in the circuit including the primary winding 12 of the transformer 8 and the load circuit and that a voltage is impressed upon the winding of the reclosing relay 7 which depends upon the rate of change of current in the primary winding 12 of the transformer which in turn depends upon the relative amounts of inductance and resistance of load connected to the load circuit. The relay 7 is arranged so that if the voltage induced in the secondary winding 13 of the transformer 8 is above a certain value, the relay 7 operates and prevents the closing coil 14 of the circuit breaker 3 from being energized and effects the deenergization of the time relay 11 and the contactor 10 so that the above cycle of operation is repeated after another predetermined interval. When, however, the voltage induced in the secondary winding 13 is less than a predetermined value, the relay 7 does not operate and the necessary connections are completed to effect the energization of the closing coil 14 to close the circuit breaker 3.

In order to allow sufficient time for the contactor 10 and time relay 11 to be restored to their normal positions in case the reclosing relay 7 is operated to prevent the reclosing of the circuit breaker, the relay 7 is arranged in any suitable manner so that its contacts do not reset as soon as the relay is deenergized. As shown the relay is held in its open position by means of a latch 16 which is arranged to be released by a coil 17, the circuit of which is arranged to be completed through contacts 18 of the time relay 11 and contacts 19 of the contactor 10, these contacts being closed only when the respective devices are in their normal positions.

As shown, the circuit breaker 3 comprises a pair of relatively movable switch contacts 20 and 21 for connecting the conductors 1 and 2 together. The contact 20 is carried by the pivotally mounted switch member 23 which is biased to the open position by the effect of gravity and also by means of the spring 24. The switch member 23 is arranged to be held in the closed position by means of the holding electromagnet 25 which has a magnetic movable member or armature 26. The armature is carried by the member 27 which is pivotally connected to the support of the circuit breaker at 28 and pivotally connected to the switch member 23 at 29.

The closing means for the circuit breaker comprises an operating member 30 which is pivotally mounted in the support of the circuit breaker. This operating member carries a roller 31 at its upper end and which is adapted to cooperate with the lower end of the switch member 23, that is the end opposite to the end which carries the contact 20. The operating member is operated by the electromagnet 14 having a plunger connected to the operating member.

The holding electromagnet 25 is provided with a coil 33. The armature 26 of the electromagnet 25 is adapted to bridge the poles 34 and 35 of the electromagnet and the conductor 36, which is connected in series with the conductors 1 and 2 when the circuit breaker is closed, is disposed in the air gap between the two poles 34 and 35. The conductor 36 is so arranged in the air gap that the direction of the magnetic flux set up by the current in the conductor 36, when current flows from conductor 1 to conductor 2, is such that as the current in the conductor 36 increases, the path of the flux set up by the holding coil 33 is changed and in the drawing is deflected to the right of the conductor 36, thus demagnetizing the armature 26 and permitting the switch member 23 to be moved to its open position by the spring 24 when the current in the conductor 36 exceeds a predetermined value.

An inductive shunt 38 is provided around the conductor 36 for accelerating the increase of current in the conductor 36 when the current through the circuit breaker contacts 20 and 21 increases rapidly as upon the occurrence of a short circuit. This feature is described and claimed in the Tritle Reissue Patent 15,441, granted August 29, 1922 and assigned to the same assignee as this application.

The circuit of the closing coil 14 of the circuit breaker 3 is controlled by an auxiliary relay 41 which in turn is controlled by a time relay 42. The circuit of the time relay 42 is completed by the operation of time relay 11. The time relay 42 is designed in any suitable manner so that it does not close its contacts 43 and complete the circuit of the auxiliary relay 41 until after the coil of the relay 42 has been energized a certain length of time. This time delay is provided in order to give the reclosing relay 7 sufficient time to operate and effect the deenergization of the time relays 11 and 42 to prevent the reclosing of the circuit breaker in case the rate of change of the current in the load circuit exceeds a predetermined value. The coil of the auxiliary relay 41 is arranged to be connected in parallel with a resistor 44 which is connected in series with the holding coil 33 of the circuit breaker 3 so that the current through the holding coil is increased to increase the holding effect and thereby compensates for the vibration that accompanies the movement of the switch members 23 and 27 due to the energization of the closing coil 14.

Since the auxiliary contacts of the circuit breaker are operated by the movement of the switch members 23 and 27 upon the energization of the closing coil 14, whereas the main contacts 20 and 21 are not closed until the closing coil 14 is subsequently deenergized, it is necessary to deenergize the coil 14 in order to close the main contacts 20 and 21. This is accomplished by having the closing of the auxiliary contacts 47 and 76 complete a short circuit around both the resistor 44 and the coil of the relay 41. This short circuit also increases the excitation of the holding coil 33 so that the holding effect thereof is materially increased during the time the spring 24 is moving the switch member 23 relatively to the switch member 27, thereby closing the main contacts 20 and 21 of the circuit breaker. This feature of increasing the excitation of the holding coil during the closing operation of the circuit breaker is described and claimed in a copending application, Serial No. 683533 filed Dec. 31, 1923, by J. W. McNairy and John F. Tritle and assigned to the same assignee as this application.

Since it is desirable to maintain the contactor 10 closed until after the circuit breaker 3 has closed its main contacts, the closing of the auxiliary contacts 74 of the circuit breaker when the coil 14 is energized connects the terminal of the coil of the contactor 10, which was connected to ground, by contacts 64', to conductor 2. Therefore the difference in voltage between the two sections is impressed upon the coil of the contactor 10 so that the contactor does not drop out until after the main contacts of the circuit breaker have closed and have short circuited the coil of the contactor 10. In order to prevent a short circuit from being completed between conductor 2 and ground, as in case the contacts 64' and 74 overlap, a resistor 80 is provided between the contacts 64' and the conductor 63.

In some cases it may be desirable to arrange the system so that the circuit breaker 3 may be reclosed whenever either section of the two sections which the circuit breaker is arranged to connect together is energized and the electrical conditions of the other section are such that the reclosing relay 7 does not operate when the contactor 10 is closed. In order to accomplish this result it is necessary to provide suitable means for supplying an operating voltage to all of the control devices when either section is energized. For accomplishing this result I have shown a directional relay 50 and an auxiliary relay 51 which is controlled thereby and which is arranged to connect the conductor 53, to which the control devices are connected, either to conductor 1 or conductor 2, depending upon which one has the higher voltage when the circuit breaker 3 is open. The directional relay 50 is provided with a magnetizing winding 55 connected between the conductor 2 and ground and an operating winding 56 connected between the conductors 1 and 2 so that the direction of the current through the operating winding depends upon relative voltages of the two circuits which the circuit breaker 3 connects together. The relay 50 is arranged so that when the voltage between conductor 1 and ground is higher than the voltage between conductor 2 and ground, the relay 50 maintains its contacts 57 open. Consequently the auxiliary relay 51 is deenergized and the conductor 53 is connected to the conductor 1 by the contacts 52 of the relay. When, however, the voltage between conductor 2 and ground is higher than the voltage between conductor 1 and ground, the relay 50 closes its contacts 57 and connects the coil of the auxiliary relay 51 between the conductor 2 and ground. The energization of the relay 51 disconnects the conductor 53 from the conductor 1 and connects it to the conductor 2 by means of the contacts 54. The relay 50 is so designed that after the circuit breaker 3 closes and short circuits the operating coil 56, the energization of only the winding 55 maintains the relay in whichever position it is when the circuit breaker closes.

This particular arrangement whereby an operating voltage is obtained from the section having the greater voltage when the circuit breaker is open, is described and claimed in my copending application Serial No. 602,691, filed November 23, 1922 and assigned to the same assignee as this application.

The operation of the system shown is as follows: When the circuit breaker 3 is closed the energization of the holding coil 33 maintains the circuit breaker in its closed position. Upon the occurrence of an abnormal condition on the load circuit 2, the circuit breaker opens when the current through the conductor 36 exceeds a predetermined value. The closing of the auxiliary contacts 46 of the circuit breaker 3 completes a circuit from the main control conductor 53, which is connected by the contacts 52 of the auxiliary relay 51 to the conductor 1, through auxiliary contacts 46 of the circuit breaker 3, conductor 60, coil of the time relay 11, conductor 61, contacts 62 of the reclosing relay 7 to ground. After a predetermined time delay, the time relay 11 closes its contacts 45 and thereby completes a circuit from the main control conductor 53 through the coil of time relay 42, conductor 63, contacts 45 of the time relay 11 to ground. As mentioned above the time relay 42 is used in order to insure that the reclosing relay 7 has sufficient time to function before the circuit breaker 3 closes.

In parallel with the coil of the time relay 42 there is also a circuit from the main control conductor 53, through the coil of the contactor 10, conductor 64, auxiliary contacts 64' of the circuit breaker, resistor 80, conductor 63, contacts 45 of the time relay 11 to ground. The closing of the contactor 10 completes a circuit from conductor 1, through the main contacts 81 of contactor 10, the current limiting resistor 9, and the primary winding 12 of the transformer to the conductor 2. The rate of change of current through this circuit controls the operation of the reclosing relay 7, the coil of which is connected across the secondary winding 13 of the transformer 8. If there is a short circuit or an excessive amount of useful load connected between the conductor 2 and ground, the rate of change of current in the primary winding 12 is sufficient to cause the relay 7 to open its contacts.

The opening of the contacts 62 of the reclosing relay 7 deenergizes the time relay 11 which in turn deenergizes the contactor 10 so that the circuit through the resistor 9 and the primary winding 12 is opened. The deenergization of the time relay 11 deenergizes the time relay 42 so that the circuit of the closing coil 14 is not completed. As soon as the contactor 10 has opened and the time relay 11 has reset, a circuit is completed from the main control conductor 53, auxiliary contacts 46 of the circuit breaker 3, conductor 60, resistor 65, contacts 19 of the contactor 10, conductor 66, contacts 18 of the time relay 11, conductor 67, reset coil 17 of the reclosing relay 7 to ground. The energization of the reset coil 17 releases the latch 16, which maintains the reclosing relay in its open position, so that the reclosing relay is reset and the time relay 11 is again energized to repeat the above cycle of operation. The reclosing relay 7 in resetting closes its contacts 69 and short circuits its reset coil so that the latch is restored to its initial position.

When there is neither a short circuit connected to the load circuit nor an excessive amount of useful load connected across the load circuit, the rate of change of the current in the primary winding 12 of the transformer 8 is not sufficient to operate the reclosing relay 7 when the contactor 10 closes. Therefore, the time relay 42 remains energized for sufficient length of time after the contactor 10 closes, to close its contacts 43 and complete a circuit from the main control conductor 53, through the holding coil 33 of the circuit breaker, conductor 70, coil of the relay 41, conductor 71, contacts 43 of the time relay 42 to ground. The closing of the contacts 72 of the relay 41 completes a circuit from the main control conductor 53, contacts 72 of the relay 41, conductor 73, closing coil 14 of the circuit breaker 3 to ground. The energization of the closing coil 14 then resets the closing mechanism of the circuit breaker. The resetting of the closing mechanism opens the auxiliary contacts 46 and 64' and closes the auxiliary contacts 47 and 74, which completes a short circuit around the coil of relay 41 and contacts 43 of relay 42, through contacts 47, conductor 75 and contacts 76 of contactor 10 to ground.

The opening of the auxiliary contacts 64' of the circuit breaker opens the initial energizing circuit of the contactor 10 but the closing of the auxiliary contacts 74 connects the coil of the contactor 10 between conductors 1 and 2 so that the contacts 76 and 81 of the contactor 10 remains closed until the main contacts of the circuit breaker close. The opening of the auxiliary contacts 46 deenergizes the time relay 11 which in turn opens the circuit of the time relay 42. The deenergization of the time relay 42 opens the circuit of the relay 41. The opening of the contacts 72 of the relay 41, deenergizes the closing coil 14 so that the spring 24 closes the main contacts 20 and 21 of the circuit breaker 3. The opening of the contactor 10 after the circuit breaker closes opens the short circuit around the resistor 44, thereby restoring the energization of the holding coil to its normal value when the circuit breaker is closed.

In case the source 4 should fail and there were no other sources connected across either of the circuits, which the circuit breaker connects together, it is evident that the circuit breaker 3 would open due to the deenergization of the holding coil. If under these conditions the load circuit 2 should be energized from some other source (not shown), it is desirable that the circuit breaker 3 should close and energize the supply circuit 1, especially if there are several other load circuits not shown which are arranged to be energized from the supply circuit. It is evident that if sufficient voltage is impressed upon the conductor 53 to operate the different control devices arranged to be connected thereto, the reclosing equipment will operate in the manner above described to control the reclosing of the circuit breaker 3 except that it will control the reclosing in accordance with the electrical conditions of the supply circuit instead of the load circuit. In order to impress a high enough voltage across the control devices under these conditions the directional relay 50 operates in a manner fully described in my above-mentioned copending application to close its contacts as soon as the load circuit is energized and thereby energize the auxiliary relay 51. The relay 51 by opening its contacts 52 and closing its contacts 54 disconnects the conductor 53 from the conductor 1 and connects it to the conductor 2 so that the voltage of the load circuit is impressed upon the control devices.

While I have shown and described only one embodiment of my invention, I do not desire to be limited thereto, but seek to cover in the appended claims all those modifications that fall within the true spirit and scope of my invention.

What I claim as new and desire to secure by Letters Patent of the United States, is,—

1. In an automatic reclosing circuit breaker system, the combination of a supply circuit, a load circuit, a circuit breaker arranged to connect said supply circuit to said load circuit, closing means for said circuit breaker, electroresponsive means for producing a current change in said load circuit when said circuit breaker is open, a reclosing relay connected and arranged to be responsive to the rate of change of the current produced by the operation of said electroresponsive means for controlling said closing means, and means for controlling the resetting of said reclosing relay controlled by said electroresponsive means.

2. In an automatic reclosing circuit breaker system, the combination of a supply circuit, a load circuit, a circuit breaker adapted to connect said circuits together, means adapted to effect the opening of said circuit breaker in response to an abnormal condition on said load circuit, closing means for said circuit breaker, current limiting means, electroresponsive means adapted to be energized after said circuit breaker opens to effect the completion of a circuit between said supply circuit and said load circuit and including said current limiting means, a reclosing relay connected and arranged to be responsive to the rate of change of the current through said current limiting means and said load circuit to effect the deenergization of said electroresponsive means and to prevent the energization of said closing coil when the rate of change of the current exceeds a predetermined value, and locking means for said reclosing relay controlled by said electroresponsive means whereby said reclosing relay is maintained in its operated position until said electroresponsive means is restored to its deenergized position.

3. In an automatic reclosing circuit breaker system, the combination of a supply circuit, a load circuit, a circuit breaker adapted to connect said circuits together, means adapted to effect the opening of said circuit breaker in response to an abnormal condition of said load circuit, closing means for said circuit breaker, electroresponsive means for effecting a current change in said load circuit when said circuit breaker is open, a time relay connected and arranged to be responsive to the opening of said circuit breaker for effecting the operation of said electroresponsive means, a reclosing relay connected and arranged to be responsive to the rate of change of the current produced by the operation of said electroresponsive means to control said closing means and said time relay, and means for controlling the resetting of said reclosing relay controlled by said time relay.

4. In an automatic reclosing circuit breaker system, the combination of a supply circuit, a load circuit, a circuit breaker adapted to connect said circuits together, means adapted to effect the opening of said circuit breaker in response to an abnormal condition on said load circuit, closing means for said circuit breaker, current limiting means, electroresponsive means for completing a circuit between said supply circuit and said load circuit and including said current limiting means, a circuit for said electroresponsive means, a time relay arranged to control the circuit of said electroresponsive means, a circuit for said time relay arranged to be completed in response to the opening of said circuit breaker, a reclosing relay connected and arranged to be responsive to the rate of change of the current through said current limiting means and said load circuit to control said electroresponsive means and said time relay, and locking means for said reclosing relay controlled by said electroresponsive means and said time relay.

5. In an automatic reclosing circuit breaker system, the combination of a supply circuit, a load circuit, a circuit breaker adapted to connect said circuits together, means adapted to effect the opening of said circuit breaker in response to an abnormal condition of said load circuit, closing means for said circuit breaker, electroresponsive means for effecting a current change in said load circuit when said circuit breaker is open, a time relay connected and arranged to be responsive to the opening of said circuit breaker for effecting the operation of said electroresponsive means, a second time relay connected and arranged to be responsive to the opening of said circuit breaker for controlling the operation of said closing means, and a reclosing relay for controlling the operation of both of said time relays connected and arranged so as to be responsive to the rate of change of the current produced by the operation of said electroresponsive means.

6. In an automatic reclosing circuit breaker system, the combination of a circuit breaker arranged to connect two circuits together, means adapted to effect the opening of said circuit breaker in response to an abnormal condition on one of said circuits, a closing coil for said circuit breaker, a circuit for said closing coil, a time relay for controlling the circuit of said closing coil, a circuit for said time relay arranged to be completed in response to the opening of said circuit breaker, a current limiting means, electroresponsive means adapted to complete a circuit including said current limiting means between said two circuits, a circuit for said electroresponsive means, a second time relay for controlling the circuit of said electroresponsive means, a circuit for said second time relay arranged to be completed in response to the opening of said circuit breaker, and a reclosing relay for controlling the circuits of said time relays connected and arranged so as to be responsive to the rate of change of the current in the circuit adapted to be completed by said electroresponsive means whereby the reclosing of said circuit breaker is prevented when the rate of change of the current exceeds a predetermined rate.

7. In an automatic reclosing circuit breaker system, the combination of a circuit breaker arranged to connect two direct current circuits together, means adapted to effect the opening of said circuit breaker in response to abnormal conditions on one of said circuits, closing means for said circuit breaker, a current limiting means, electroresponsive means adapted to complete a circuit including said current limiting means between said two direct current circuits, a circuit for said electroresponsive means, a time relay arranged to control the circuit of said electroresponsive means, a circuit for said time relay, contacts in said last-mentioned circuit, a relay for controlling said contacts and said closing means having a coil so connected to the circuit which is adapted to be completed by said electroresponsive means that the operation of said relay is responsive to the rate of change of the current in said circuit, and means controlled by said time relay and said electroresponsive means for controlling said contacts.

8. In an automatic reclosing circuit breaker system, the combination of a circuit breaker arranged to connect two direct current circuits together, means adapted to effect the opening of said circuit breaker in response to abnormal conditions on one of said circuits, a closing coil for said circuit breaker, a circuit for said closing coil, a time relay for controlling said closing coil circuit, a circuit for said time relay, a current limiting means, electroresponsive means adapted to complete a circuit including said current limiting means between said two direct current circuits, a circuit for said electroresponsive means, a second time relay arranged to control the circuit of said first-mentioned time relay and said electroresponsive means, a circuit for said second time relay arranged to be completed in response to the opening of said circuit breaker, contacts in said last-mentioned circuit, a transformer having its primary winding connected in series with the circuit adapted to be completed by said electroresponsive means, a relay for opening the contacts in the circuit of said second time relay, a winding for said relay connected to the secondary winding of said transformer, locking means for maintaining said contacts in their open position, a coil arranged when energized to render said locking means inoperative, a circuit for said coil and contacts in said last-mentioned circuit controlled by said second time relay and said electroresponsive means.

In witness whereof, I have hereunto set my hand this 7th day of August, 1923.

ARVID E. ANDERSON.